United States Patent [19]

Shima et al.

[11] Patent Number: 4,524,355
[45] Date of Patent: * Jun. 18, 1985

[54] ABNORMAL VIBRATION MONITOR

[75] Inventors: Ichiji Shima, No. 7, Kawahara Hiyou, Kamo-cho, Sagara-gun, Kyoto-fu, Japan; Shigeru Yoshibayashi, No. 1208-1, Ohaza-Tobi, Sakurai-shi, Nara-ken, Japan; Ryosuke Taniguti, Nagasaki, Japan

[73] Assignees: Mitsubishi Denki Kabushiki Kaisha, Tokyo; Ichiji Shima; Shigeru Yoshibayashi, both of Amagasaki, all of Japan

[*] Notice: The portion of the term of this patent subsequent to Jun. 18, 1999 has been disclaimed.

[21] Appl. No.: 112,288

[22] Filed: Jan. 15, 1980

[30] Foreign Application Priority Data

Jan. 16, 1979 [JP] Japan .................................. 54-3703

[51] Int. Cl.³ ...................... G08C 15/08; G08C 19/00; G08C 19/38
[52] U.S. Cl. ............................ 340/870.13; 340/870.3; 340/870.39
[58] Field of Search ........... 340/870.13, 870.3, 870.39, 340/870.16, 870.11, 870.14

[56] References Cited

U.S. PATENT DOCUMENTS

| | | | |
|---|---|---|---|
| 1,806,871 | 5/1931 | Bower | 340/870.3 |
| 3,750,155 | 7/1973 | Oman | 340/870.13 |
| 3,764,983 | 10/1973 | Stok | 340/870.13 |
| 3,948,098 | 4/1976 | Richardson et al. | 340/870.3 |

Primary Examiner—James J. Groody
Attorney, Agent, or Firm—Oblon, Fisher, Spivak, McClelland & Maier

[57] ABSTRACT

An abnormal vibration monitor is used for a monitor by detecting the abnormal vibration of a rotary device placed in an explosive atmosphere by using a plurality of piezo-pick-ups. In the monitor, many signal wires and power source wires for devices are placed in an explosive atmosphere whereby there is a possibility of an explosion. In order to prevent the explosion, pre-amplifiers for detection which are respectively connected to the piezo-pick-ups and scanners for scanning the pre-amplifiers and power sources are contained in one antiexplosion casing and the casing is placed in the explosive atmosphere and the parts in the casing are connected by only small number of cables to the monitor placed in an nonexplosive atmosphere. The piezo-pick-ups are respectively fixed to parts for vibration out of the casing to give high detection accuracy.

5 Claims, 6 Drawing Figures

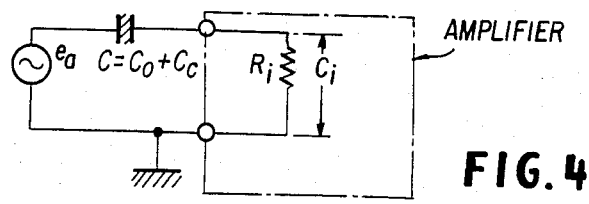
FIG. 4
EQUIVALENT CIRCUIT
FIG. 5
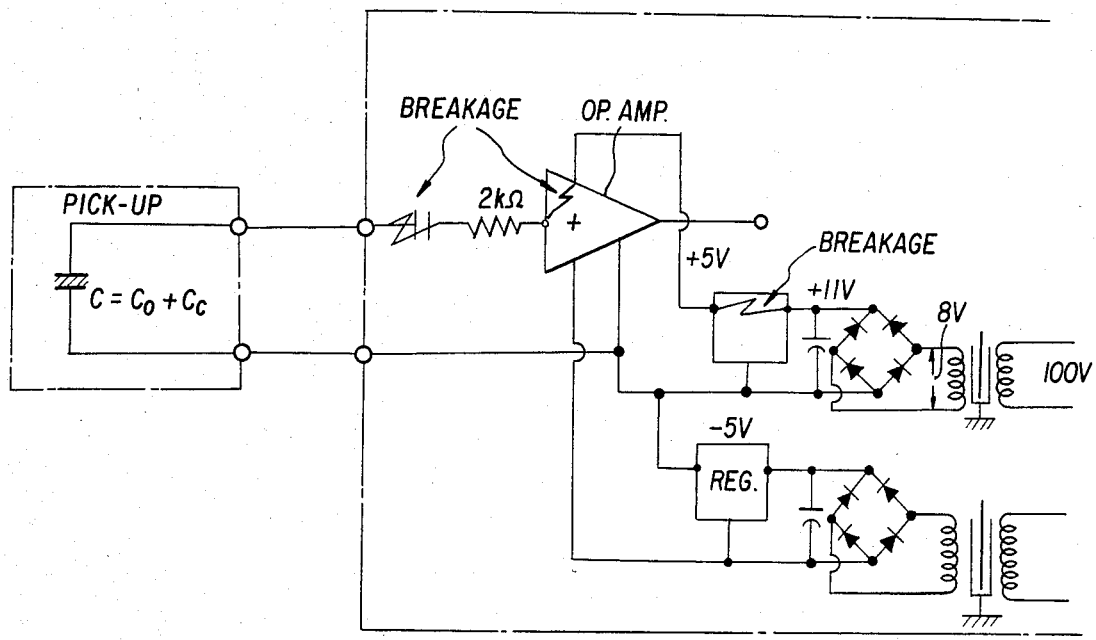
FIG. 6
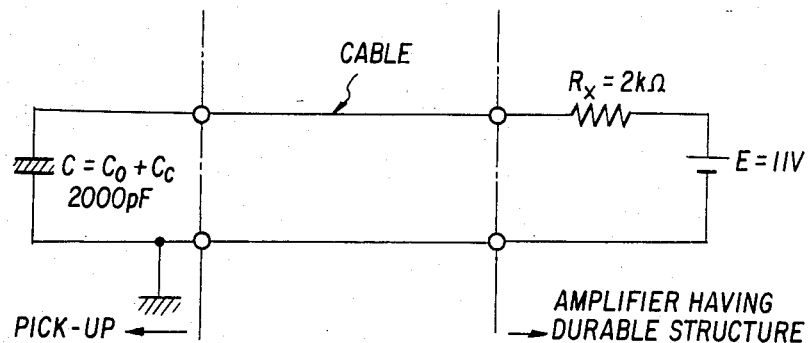

ABNORMAL VIBRATION MONITOR

BACKGROUND OF THE INVENTION

1. Field of the Invention

The present invention relates to an abnormal vibration monitor which detects an abnormal vibration of rotary devices etc. in an explosive atmosphere by piezo-pick-ups and monitors the abnormal vibration.

2. Description of the Prior Art

FIG. 1 is a schematic view of a structure of a detector of a conventional vibration monitor and FIG. 2 is a schematic view of a structure of a conventional vibration monitor.

In FIGS. 1 and 2, the reference numeral (1) designates a pressure durable antiexplosion casing; (2) designates a piezo-acceleration pick-up; (3) an output cable of the pick-up (2); (4) designates a pre-amplifier (a charge amplifier); (5) designates a cable for a power source of the pre-amplifier (4); (6) designates an output cable for the pre-amplifier (4); and (7) designates a monitor-alarm which detects a vibration waveform signal transmitted from the output cable (6) and alarms when an abnormal condition is detected.

The pressure durable antiexplosion casing (1) is equipped with a bearing of a rotary device in an explosive atmosphere. The vibration acceleration caused at the part, is converted to a corresponding voltage by a piezo-acceleration pick-up (2). In order to prevent attenuation of the voltage in low frequency when the output cable is long, the pre-amplifier (4) is connected. The output from the pre-amplifier (4) is transmitted to a monitor-alarm departed from the explosive atmosphere to detect an abnormal vibration.

The monitor having said structure can detect vibrations of rotary devices at a plurality of parts. The pick-up (2) and the pre-amplifier (4) are contained in the pressure durable antiexplosion casing. Even though an abnormal failure is caused in the pre-amplifier (4), the explosion in the atmosphere is prevented. However, this structure requires a plurality of the output cables (6) for connecting the casing (1) to the monitor-alarm (7) whereby a possibility of a failure is increased and a cost for the cables is increased and an instrumental operation and maintenance operation are also increased.

SUMMARY OF THE INVENTION

It is an object of the present invention to provide a simple connection of an abnormal monitor and an acceleration detecting side from the antiexplosive and economical viewpoints. Moreover, a piezo-pick-up is independently placed on a detected part in order to increase accuracy.

BRIEF DESCRIPTION OF THE DRAWINGS

FIG. 4 is an equivalent circuit diagram of a connection of a piezo-pick-up and an amplifier;

FIG. 5 is a circuit diagram of the piezo-pick-up; and

FIG. 6 is an equivalent circuit diagram of the piezo-pick-up.

DETAILED DESCRIPTION OF THE PREFERRED EMBODIMENTS

Figure 1:
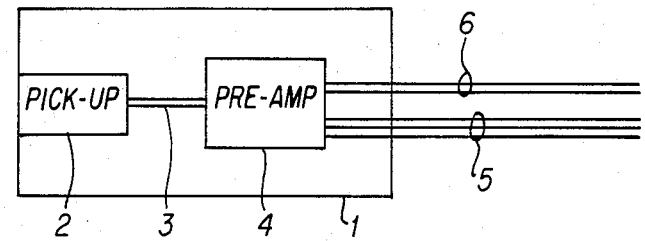
FIG. 1 is a schematic view of a structure of a detector of a conventional abnormal vibration monitor.
Figure 2:
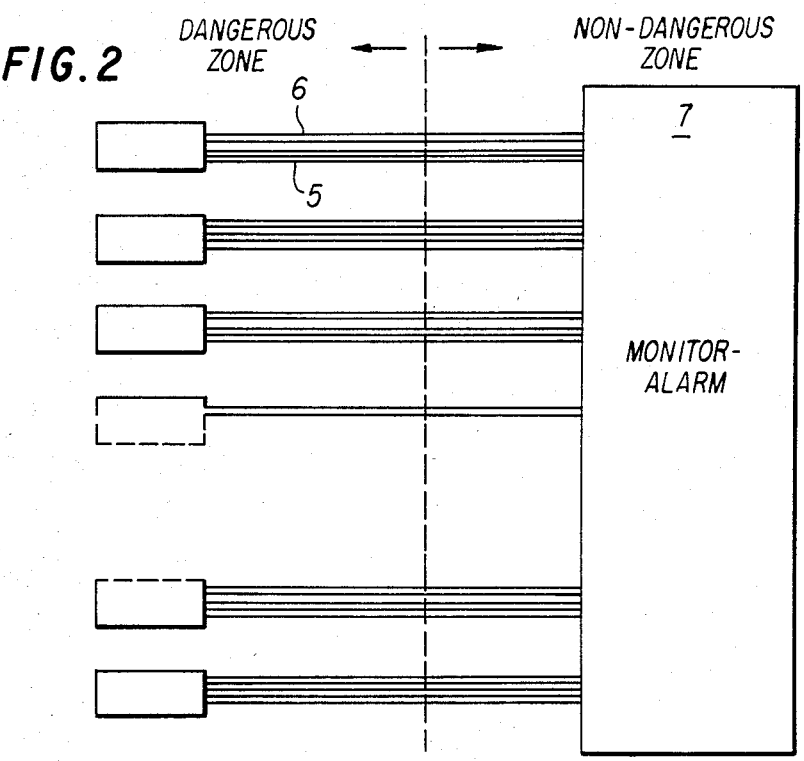
FIG. 2 is a schematic view of a structure of a conventional abnormal vibration monitor.

Referring to FIG. 4, the connection of the piezo-pick-up and the amplifier is considered. The theoretical equation is given as follows.

$$e_i = \frac{R_i}{\sqrt{R_i^2 + \frac{1}{(\omega c)^2}}} \cdot e_a \quad (1)$$

| | | Value in abnormal vibration (maximum) |
|---|---|---|
| $e_a$ = | voltage generated by the pick-up | 1000 mV (20 G.) |
| $C_o$ = | inner capacity of the pick-up | 1000 pF |
| $C_c$ = | distribution capacity of the cable | 1000 pF |
| $R_i$ = | input resistance of the amplifier bias-resistance (min.) | 20 MΩ |
| $\omega$ = | angular velocity of acceleration max. fmax. | 20 KHz |

As it is understood by the equation (1), when $e_a$ is a DC voltage, the circuit has infinite impedance because of the capacity C and no current is passed. However, the pick-up is substantially an accleration sensor, a DC voltage is not caused except it is charged. In usual, the AC voltage shown in FIG. 4 is given.

The safety of the piezo-acceleration pick-up is maintained by the following two modes.

(1) Signal current in normal state:

The amplifier is usually designed to give theoretically infinite input resistance. When it is supposed to decrease the input resistance of the amplifier to the bias resistance, and to operate the amplifier in the maximum frequency for the phenomenon, the impedance caused by the capacity C is remarkably smaller than the input resistance $R_i$. When it is supposed to apply all voltages of the pick-up to the input resistance, the current $I_1$ is given by the equation:

$$I_1 = \frac{e_a}{R_B} \quad (2)$$

The constants of the equation (1) are substituted in the equation (2) to give the equation:

$$I_1 = \frac{1000 \text{ (mV)}}{20 \text{ (M}\Omega\text{)}} = 50 \text{ (nA)}$$

Therefore, the safety can be maintained even though a breaking of a signal wire is caused.

(2) Signal current in short circuit:

When the signal wire short-circuits to the ground GND, the load for $e_a$ is only C and accordingly, a short-circuit current $I_s$ is given by the equation:

$$I_s \approx \omega C e_a \quad (3)$$

The constants of the equation (1) are substituted in the equation (3) to give the equation:

$$I_s = 2\pi \times 20 \times 10^3 \times 2000 \times 10^{-12} \times 1000 \times 10^{-3} = 0.25 \text{ mA}$$

The safety can be maintained even though such current is passed or not. As described above, even though the break or short-circuit of the cable is caused, the acceleration pick-up does not result a spark firing.

Referring to FIGS. 5 and 6, the safety in the abnormal condition of the amplifier circuit will be described.

The acceleration pick-up is connected to the amplifier contained in the pressure durable casing so as to attain an impedance conversion. When an abnormal condition is found in the amplifier or its power source, there is a possibility to apply the DC input voltage of the power source itself to the input terminal of the operation amplifier. When the voltage in the secondary side of the transformer is 8 V (RMS), it is given as $8 \times \sqrt{2} \approx 11$ V (positive or negative). The pick-up has the capacity load shown in FIG. 5.

FIG. 6 is a simplified equivalent circuit to the circuit shown in FIG. 5. As it is understood from FIG. 5, when the amplification circuit is in the abnormal condition, the acceleration pick-up is charged through the resistor $R_x$. Even though the cable is broken in this condition, any current is passed from the amplification circuit. When the cable is short circuited, the following two modes are considered.

One is a current passed during the discharge of the charge in the capacitor C. The composed capacity of the pick-up and the cable is 200 pF ($2 \times 10^{-3} \mu F$) which is remarkably smaller than the firing limit of the capacitor circuit. Therefore, there is no trouble.

The other is to short-circuit the abnormal voltage E through $R_x$. The current is given as $$I_s = \frac{11 \text{ V}}{2 \text{ (k}\Omega\text{)}} \approx 5.5 \text{ mA}$$

which is also remarkably less than the firing limit. There is no possibility of an explosion.

The monitor is connected to the sensor through a small number of signal wires whereby a labor and the cost for the equipment can be small. The pick-up (2) is respectively fixed to each rotary device so as to be high accuracy. Between the piezo-acceleration pick-up (2) and the pre-amplifier (4), it is necessary to use output cables (3) corresponding to the number of the piezo-acceleration pick-ups (2). In usual, only about 50 nA of current is passed through the output cable (3) and accordingly, there is no trouble of a spark firing even though the cables are broken. When the output cables (3) is short-circuitted, the current is only about 0.25 mA and a safety can be maintained without failure.

Figure 3:
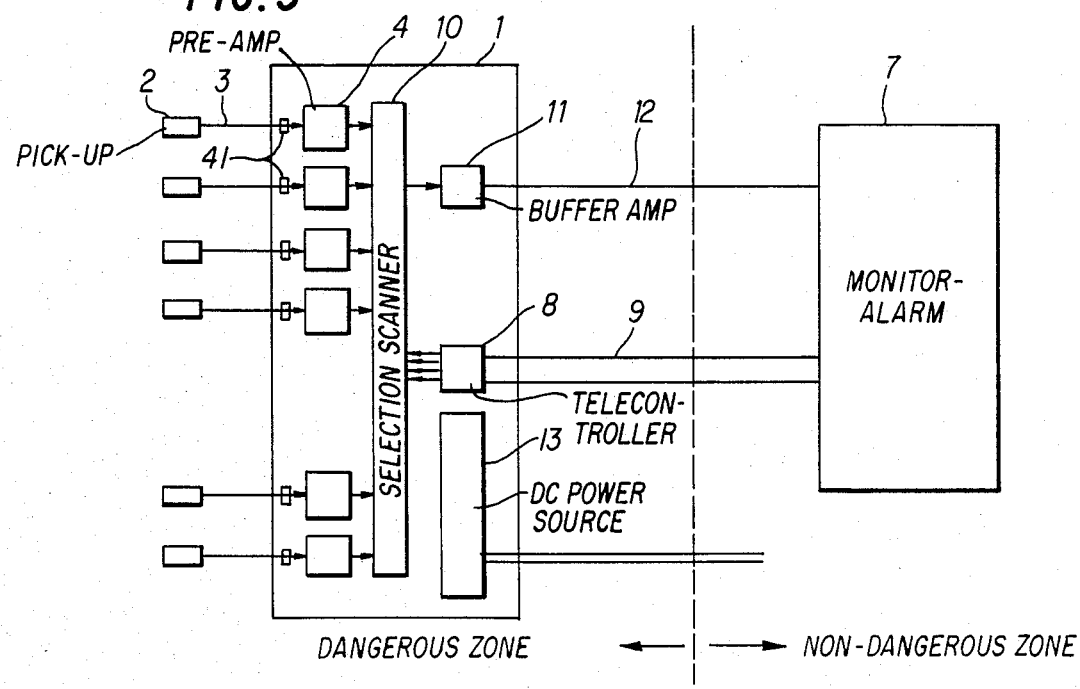
FIG. 3 is a schematic view of a structure of one embodiment of the abnormal vibration monitor of the present invention.

In the embodiment of FIG. 3, the reference numeral (1) designates a pressure durable antiexplosion casing; (2) designates a piezo-acceleration pick-up placed out of the casing (1); (4) designates a pre-amplifier having high input impedance characteristics; (8) designates a telecontroller which receives serial channel switching signals from the monitor (7) through the cable (9) to give parallel signals converted from the serial signals; (10) designates a selection scanner which receives the parallel signals from the telecontroller (8) to select the output of the specific per-amplifier (4) and to transmit the output in time-division; (41) designates a resistor having about 2 kΩ placed between the pick-up (2) and the pre-amplifier (4); (11) designates a buffer amplifier which receives a signal from the selection scanner (10) to amplify the signal to the level for less effect of noises; (12) designates an output cables; (13) designates a DC stabilizing power source which is connected to a commercial power source of 100 V and is insulated from an electron circuit in the casing (1) by a transformer having a contact preventing plate.

The serial channel command signals transmitted from the monitor (7) placed in a non-dangerous zone in which no explosion is caused, are transmitted through the cable (9) to the telecontroller (8). The output of the designated pre-amplifier (4) is transmitted through the output cable (12) to the monitor (7). The monitor reads vibration data to detect whether the vibration is in the abnormal or normal state. If it is abnormal an alarm is generated.

We claim:

1. An abnormal vibration monitor for use in an explosive atmosphere comprising:
   a plurality of piezo-acceleration pick-ups for detecting vibration in a plurality of parts to be monitored;
   a plurality of pre-amplifiers having high impedance characteristics which are connected to said piezo-acceleration pick-ups;
   a plurality of signal wires, each of which connects one of said piezo-acceleration pick-ups with one of said pre-amplifiers;
   a selection scanner for receiving the outputs of said pre-amplifiers and selecting one thereof as an output;
   a monitor for receiving the output from said selection scanner for transmitting a serial signal;
   a single output cable for connecting said selection scanner and said monitor;
   a telecontroller connected to said monitor and said selection scanner for receiving said serial signal from said monitor, and converting said serial signal into a parallel signal, whereby the selection scanner receives said parallel signal and selects one of the outputs of said pre-amplifiers in response thereto; and
   an anti-explosion casing containing said pre-amplifiers, said selection scanner and said telecontroller so as to prevent an explosion.

2. An abnormal vibration monitor according to claim 1 wherein each of said piezo-acceleration pick-ups is placed out of said casing and is fixed to each of said parts to be monitored.

3. An abnormal vibration monitor according to claim 2, wherein said signal wires remain mostly within said explosive atmosphere and mostly not within said antiexplosive casing and wherein the amount of current carried by said signal wires is small enough that a spark is not created even if said signal wire is broken or short-circuited.

4. An abnormal vibration monitor according to claim 3, further comprising a plurality of resistors, each of which is placed on a signal wire between said piezo-acceleration pick-ups and said pre-amplifiers, and which are contained within said anti-explosive casing.

5. An abnormal vibration monitor according to claim 4, further comprising a buffer amplifier contained within said anti-explosion casing for receiving the output of said selection scanner and providing said serial signal to said single output cable.

* * * * *